United States Patent [19]

Malinowski

[11] 4,068,130

[45] Jan. 10, 1978

[54] SMOKE DETECTOR WITH MEANS FOR CHANGING LIGHT PULSE FREQUENCY

[75] Inventor: William J. Malinowski, Pembroke, Mass.

[73] Assignee: Chloride Incorporated, Tampa, Fla.

[21] Appl. No.: 742,225

[22] Filed: Nov. 16, 1976

[51] Int. Cl.[2] .............................................. G01N 21/26

[52] U.S. Cl. .................................. 250/574; 340/237 S

[58] Field of Search ..................... 250/573, 574, 214 B; 340/237 S; 356/201, 204, 207

[56] References Cited

U.S. PATENT DOCUMENTS

| | | | |
|---|---|---|---|
| 3,711,210 | 1/1973 | Krukowski | 356/207 |
| 3,936,814 | 2/1976 | Muller-Girard | 340/237 S |
| 4,024,407 | 5/1977 | Meric | 250/574 |

*Primary Examiner*—David C. Nelms

*Attorney, Agent, or Firm*—Robert E. Ross

[57] ABSTRACT

A smoke detector operating on the reflected light principle, utilizing a pulsing light source and means requiring several consecutive pulses of light reflected from smoke to actuate an alarm. During normal standby operation, the light pulses at a predetermined slow rate. When smoke is present, the first pulse of light reflected from the smoke causes the pulse rate to increase for a predetermined number of pulses or for a predetermined short time, so that the number of reflected pulses required to actuate the alarm are received in a shorter time. The time to alarm is thereby shortened without increasing the current drain of the device and without shortening the life of the pulsing light source.

6 Claims, 6 Drawing Figures

SMOKE DETECTOR WITH MEANS FOR CHANGING LIGHT PULSE FREQUENCY

BACKGROUND OF THE INVENTION

In smoke detectors of the reflected light type, in which a photo-responsive device is used to receive light from smoke particles illuminated by a light source, one of the major problems has been that of providing a light source which is capable of operating over a long period of time without failure. For this purpose, light-emitting diodes have recently been utilized.

However, commercially available light-emitting diodes have, at their rated current, insufficient light output to function as an effective smoke detector. However, it has been found that such a diode will produce light output adequate for smoke detection purposes if it is operated at a current considerably higher than the rated current specified by the manufacturer, but its life is so short at this higher current as to make its use in a commercial smoke detector impractical.

However, I have found that if the light-emitting diode is energized at the higher current in short pulses, its light output and service life will be adequate for a continuously operating smoke detector.

A detector utilizing light-emitting diodes in this manner is disclosed in U.S. Pat. No. 3,946,241 issued to me on Mar. 23, 1976. In the detector disclosed therein, the pulse to the light-emitting diode has a duration of about 20 micro seconds, with the repetition rate being 1 pulse every 2 seconds. The detector described therein is designed to produce an alarm only if smoke is detected on two consecutive pulses.

However, it has been found desirable in some cases to increase the degree of immunity from false alarms, to require the detection of smoke by 2 or more pulses to produce an alarm, and it has also been found desirable to reduce the pulse repetition rate to, for example, 5 seconds, to increase the life of the light-emitting diode. However, the combination of these two modifications would result in an alarm response time of 10 seconds or more, which is an unacceptable length of time.

It has been suggested that on the detection of smoke by a pulse, the repetition rate could be increased, so that the required number of output pulses to produce the alarm would be produced in a shorter period of time. However, if there are no subsequent output pulses (such as when the first pulse is a result of a spurious response), the pulse rate would nevertheless continue at the high rate. This not only reduces the life of the light-emitting diode, but also increases the possibility of another false alarm being received during the period of increased pulse rate.

SUMMARY OF THE INVENTION

To increase the life of the light-emitting diode smoke detector light source by reducing the pulse repetition rate thereof without increasing the response time of the detector, I provide a novel system wherein after a light pulse has illuminated smoke present at the detector and an output response from the detection amplifier has been produced, the pulse generator thereafter produces at a faster rate, the predetermined number of pulses required to produce an alarm. If smoke is present during said predetermined number of pulses, the alarm is activated.

If smoke is not detected on each of the pulses after the first (or on the number of pulses required to activate the alarm, if less) then after the predetermined number of pulses at a faster rate have been completed the pulse rate returns to the slower standby pulse rate.

In one embodiment of the invention, the increased pulse rate may be created for a predetermined short time interval rather than for a predetermined number of pulses; however, the operation of the system is otherwise identical, in that if the required number of responses to smoke are received in the predetermined time interval, the alarm is sounded. Otherwise the pulse rate returns to the slower standby rate at the end of the predetermined time interval.

In another embodiment of the invention, each pulse that detects smoke after the first re-sets the timer, so that so long as smoke is present, the pulse generator continues to run at the faster rate. As soon as the smoke concentration has dropped below a predetermined level, the pulse rate will return to the slower rate a predetermined number of pulses, or a predetermined time, after the last pulse that causes a response due to smoke.

In another embodiment of the invention, the first pulse that detects smoke causes the pulse rate to increase to the faster rate for a predetermined number of pulses or for a predetermined time, with the subsequent pulses at the higher rate that detect smoke having no effect on the time or number of pulses during which the pulse generator runs at the faster rate. In this embodiment, if all of the predetermined number of pulses detect smoke, the alarm sounds and the pulse generator returns to the standby rate while the alarm is sounding. At the beginning of the next pulse, the alarm is deenergized. If said next pulse produced smoke, the pulse rate again increases, and if the following predetermined number of pulses detect smoke, the alarm is again sounded. This system therefore produces an alarm that sounds intermittently.

In another embodiment of the invention, such as might be used in a detector system having many detectors, once the alarm has sounded, the alarm may be locked in the alarm condition, and the pulse generator, and hence the light-emitting diode, de-energized until the alarm is turned off.

A portion of the circuitry contained in the above embodiments may be similar to that shown in my U.S. Pat. No. 3,946,241 in which, on each pulse to the light-emitting diode, a shorter pulse is applied to a bi-stable switching device, to insure that the switching device cannot pass an output signal to an integrating device. The bi-stable switching device may be a flip-flop with the shorter pulse to the light-emitting diode. If smoke is present during a first pulse, the resulting output occurring during the pulse to the light-emitting diode but after the short pulse to the re-set terminal of the flip-flop, is fed to the set terminal of the flip-flop to cause an output pulse to appear at the pulse integrator. The output pulse from the flip-flop is also fed, through a pulse counter or timer, to an electronic switch, associated with the pulse generator, to change its condition so as to increase the pulse rate as described hereinbefore.

DESCRIPTION OF THE ILLUSTRATED EMBODIMENT

Figure 1:
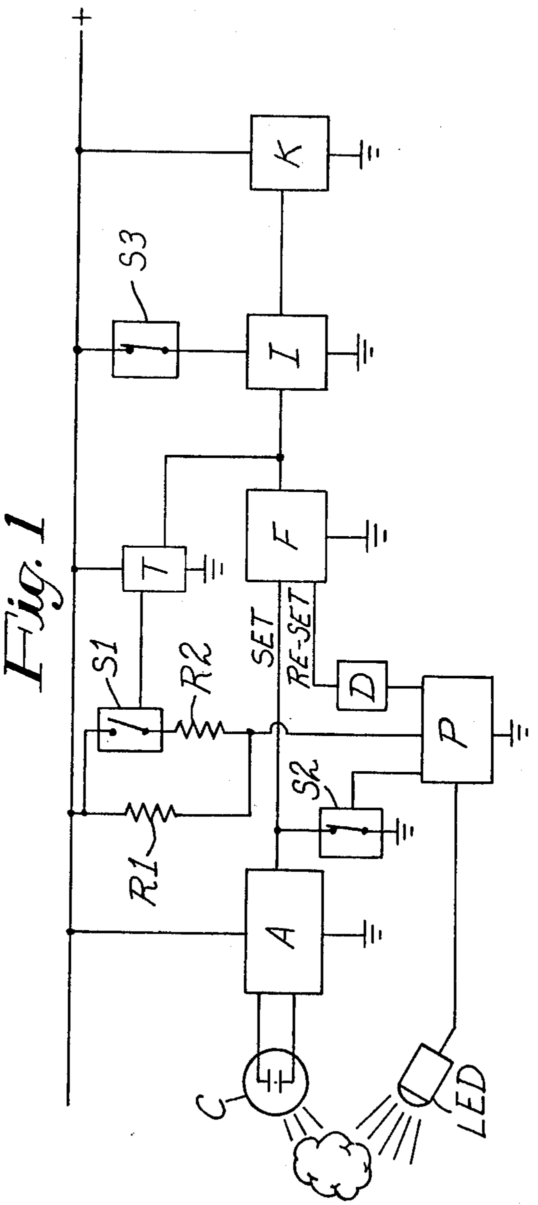
FIG. 1 is a schematic diagram of an electrical circuit for use in a smoke detector embodying the features of the invention.

Referring to FIG. 1 of the drawing, there is illustrated an electronic circuit for use in a smoke detector operating on the reflected light principle.

Certain portions of the illustrated circuit are disclosed and claimed in U.S. Pat. No. 3,946,241 issued to me on Mar. 23, 1976.

The circuit includes a light-emitting diode LED and a photo-voltaic cell C positioned out of the direct line of the beam of light from the LED. In a preferred embodiment of the invention the cell C is positioned to view a portion of the beam in front of the LED at an angle of about 135° from the axis of the beam, to take advantage of the well known "forward scatter" effect.

The output of cell C is utilized as the input to amplifier A, the output of which is fed to a bi-stable switching device such as to the set terminal of a flip-flop F.

The term "amplifier" is meant to include any required circuitry for transforming a signal from the cell C into a signal usable by the flip-flop, including any necessary stages of pre-amplification, and any means allowing an output therefrom only when the output signal reaches a predetermined level, such as a level detector. The flip-flop output is fed to an integrator I and through a pulse counter PC to an electronic switch S1, which closes in response to the flip-flop output, in a manner and for a purpose to appear hereinafter. The integrator I may have any desired time constant so that a predetermined number of pulses into the integrator are required to provide an output therefrom to the alarm K.

To provide a pulse of current to the LED and for other purposes to be described, a pulse generator P is provided, which connects to a power supply through a resistor R1. The electronic switch S1 and a resistor R2 are connected in parallel with the resistor R1. With the switch S1 open, the current to the pulse generator P has a value such that the pulse rate is, for example, 1 pulse every 5 seconds. When the switch S1 is closed, so that resistor R2 is in parallel with resistor R1, the increased current increases the pulse rate to 1 pulse every 0.2 seconds.

In addition to providing a pulse to the LED, the pulse generator also applies substantially simultaneously a pulse of substantially the same duration to a normally closed switch S2 to pulse it to the open condition for the duration of the pulse and a pulse to the set terminal of the flip-flop through discriminator D which converts the pulse to a spike at the beginning of the pulse cycle.

The switch S2 is connected between the output of the amplifier and ground, so that the amplifier output is shorted to ground except during the time that the switch S2 is pulsed open by the pulse generator.

The function of the various components of the device during a single pulse can best be described by reference to FIG. 2, which is a graph of the response of the various components of the circuit during a pulse with a predetermined level of smoke present in the light beam. The horizontal scale represents time and the vertical scale represents response. The vertical scale units are arbitrary and the height on the vertical scale of the various curves has no relation to each other except as described hereinafter.

Each cycle begins with the application of a pulse from the pulse generator to the LED, the amplifier output clamp switch S2, and the re-set terminal of the flip-flop. The pulse to the LED and the switch S2 are both represented on the diagram by P1, since they are of the same duration. They may, of course, be of different magnitudes and different polarities.

The pulse spike appearing at the re-set terminal of the flip-flop after passing through the discriminator is represented by PD1, and insures that the flip-flop is turned off at the beginning of each pulse cycle. The application of the pulse to the LED produces a light output having a duration and relative intensity represented by curve V1.

If there is no smoke in the portion of the beam viewed by the cell C, there will be no pulse of voltage generated by the cell and hence no output from the amplifier, and at the end of the pulse P1 the LED is de-energized and the switch S2 again closes to clamp the amplifier output to ground.

Figure 2:
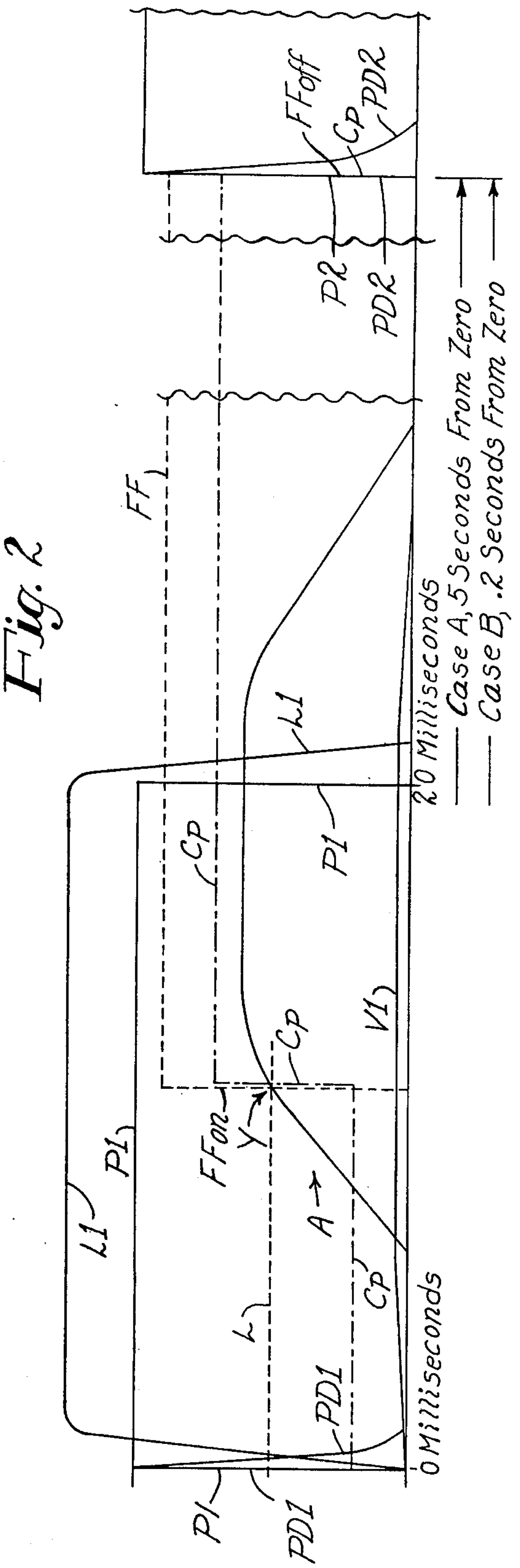
FIG. 2 is a time-response diagram illustrating the response of various components of the circuit of FIG. 1 during the pulses.

However, if there is smoke present in the light beam, a pulse of voltage will be produced by the cell, represented by curve V1 of FIG. 2, which whill be amplified by the amplifier to produce a signal at the set terminal of the flip-flop, provided that the amount of smoke is great enough to produce an output signal of the predetermined level. For example, it is common to allow an output signal, and hence an alarm, only when there is a predetermined concentration of smoke, such as 1 or 2%.

The percent smoke is usually defined as the amount of smoke that obscures that percent of a light beam per foot of length.

As illustrated in FIG. 2, the amplifier signal level necessary to allow an output to the flip-flop represented by dashed horizontal line L. Adjustment means (not shown) may be provided in the amplifier to adjust the calibration of the system so that the alarm point will be at the desired smoke percentage.

The output from the flip-flop from the first pulse is stored in the integrator I. If the 4 succeeding pulses also detect enough smoke to cause a flip-flop output, a total of 5 pulses will have been received by the integrator in the required time period, which will actuate the alarm.

However, if smoke is not detected by each of the 4 pulses following the first, the alarm will not be actuated.

Although in FIG. 2, the vertical line representing the flip-flop output and the vertical line representing the increase in current through the pulse generator are separated by a horizontal distance, it will be understood that this is for clarity, since these two events occur substantially simultaneously.

Figure 3:
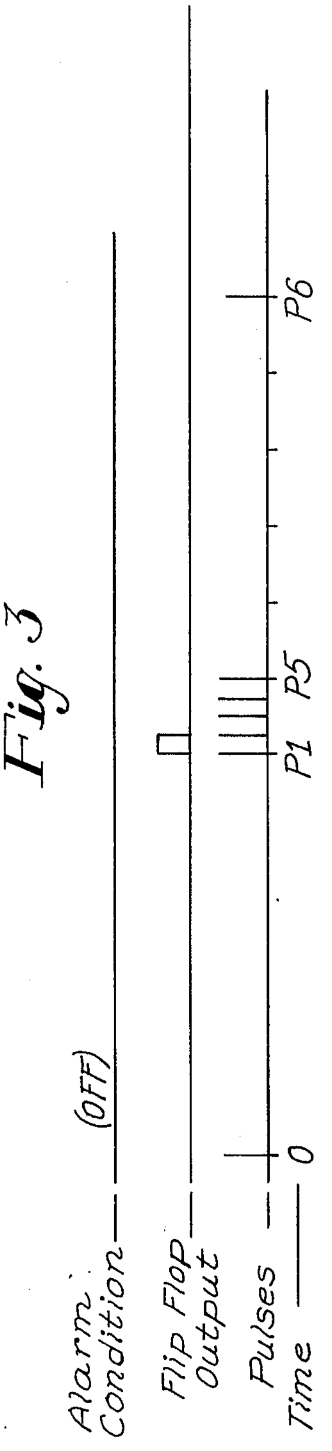
FIG. 3 is a diagram illustrating the time-spacing of the pulses occurring in the circuit of FIG. 1 when only a single pulse has detected smoke.

In one embodiment of the invention, a first pulse such as P1 (see FIGS. 2, 3, and 4) that produces a flip-flop output is fed to a timer T, the output of which operates switch S1. In this embodiment, the first pulse P1 that detects the predetermined level of smoke causes timer T to close switch S1 and thereby increase the pule rate to 5/second for a minimum time of 5 pulses. If each of the following pulses do not produce a flip-flo output, the requirements of the integrator I are not satisfied, and at the end of the 5th pulse, P5, the timer T opens switch S1 and the pule generator returns to the standby rate of 1 pulse each 5 seconds. This is illustrated in FIG. 3.

Figure 4:
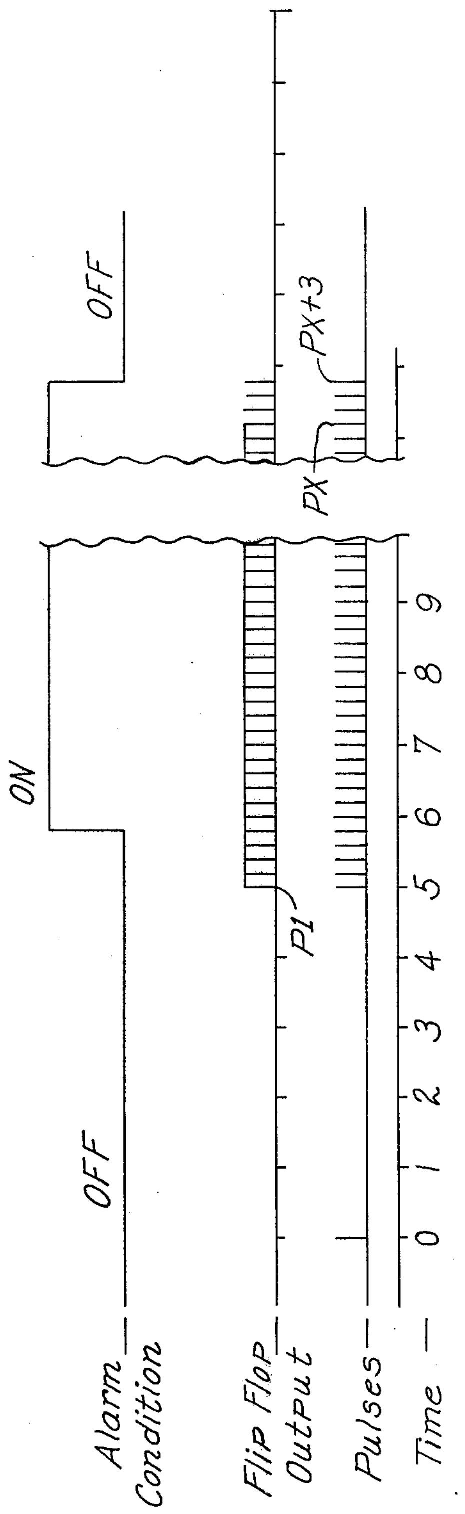
FIG. 4 is a diagram similar to that of FIG. 3 illustrating the response when smoke is continuously present.

However, as illustrated in FIG. 4, if each of the subsequent 4 pulses produces a flip-flop output due to the continuing presence of smoke, the alarm is sounded on the fifth pulse, and each pulse from the flip-flop to the timer re-starts the timer, so that the pulsing continues at the fast rate so long as smoke is present, plus 4 pulses. That is, if the smoke clears and pulse P$x$ and subsequent pulses do not detect smoke, at the end of the pulse P$x$+3, the pulse generator will return to the standby rate.

Figure 5:
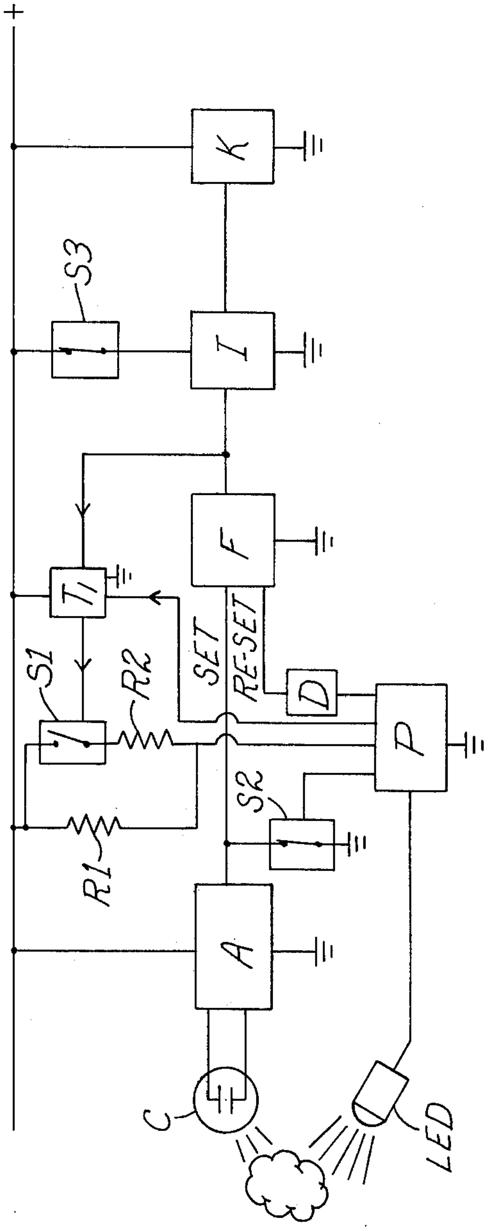
FIG. 5 is a schematic diagram of a modified form of electrical circuit for use in a smoke detector embodying the features of the invention.
Figure 6:
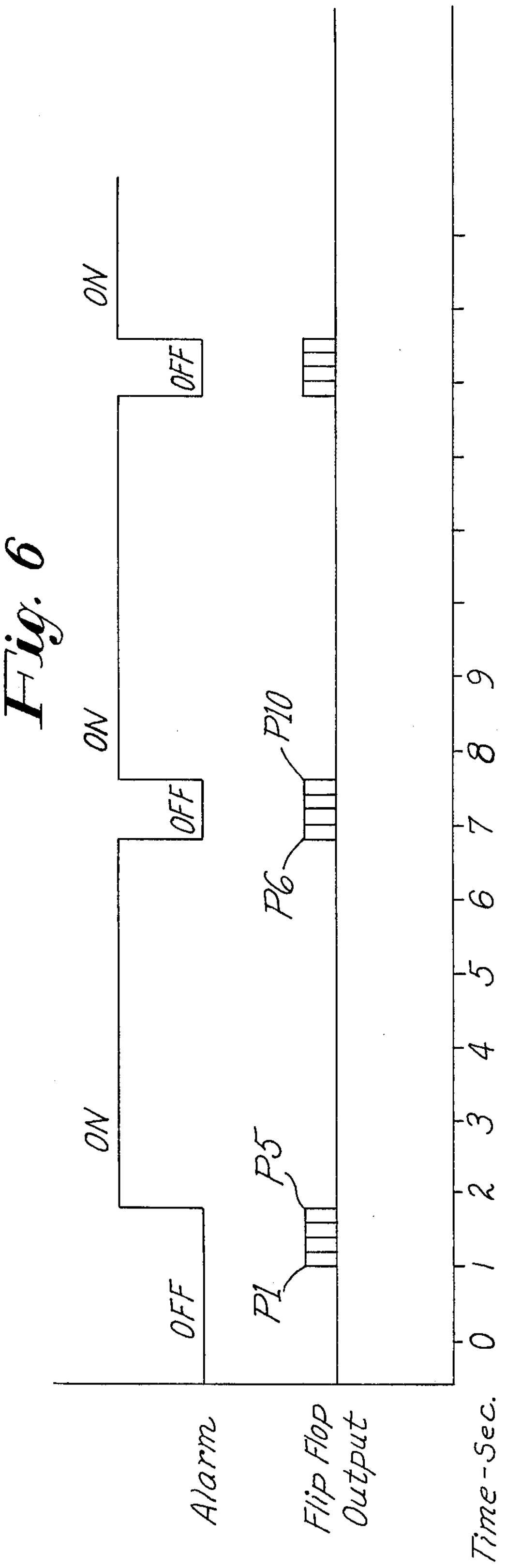
FIG. 6 is a diagram illustrating the time-spacing of the pulses occurring in the circuit of FIG. 5 and the response when smoke is continuously present.

Referring to FIGS. 5 and 6, there is illustrated another embodiment of the invention, which is similar to the embodiment of FIG. 1, in that a pulse counter or timer T1 is provided which is responsive to a first pulse from the flip-flop to close switch S1, as in the previous embodiment to increase the pulse rate. However, T1 is not responsive to subsequent pulses from the flip-flop to extend the time during which switch S1 is closed, but holds switch S1 closed for a predetermined time whether or not any further flip-flop output. The predetermined may be established in any convenient manner, such as by an RC circuit, or pulses from the pulse generator P.

If smoke is not detected on each of the subsequent pulses the requirements of the integrator I are not satisfied, and the alarm is not sounded. However, as illustrated in FIG. 6, if smoke is detected on all of the subsequent pulses, the alarm is sounded, and the pulse generator returns to the slow rate.

Since the flip-flop output to the integrator continues after the end of any pulse by which smoke is detected, the alarm will continue to be energized until the beginning of the next pulse at which the spike pulse to the re-set terminal of the flip-flop at the beginning of pulse P6 turns off the flip-flop output, which turns off the alarm.

It smoke is still present, the pulse P6 will cause a pulse to the set terminal of the flip-flop, which will again start timer T1, closing switch S1 to again increase the pulse rate. If smoke continues to be present on the subsequent 4 pulses, the alarm will be energized on pulse P10.

Hence during the presence of smoke, the alarm will be energized only between pulses when the pulse generator is running at the slow rate, and is off during the period that the pulse generator is running at the fast rate. This not only provides an intermittent alarm signal, which is considered to be more attention-getting than a steady signal, it also prevents line transients caused by the energized alarm from affecting the amplifier output.

Although the embodiment of FIG. 1 utilizes a timer and the embodiment of FIG. 5 utilizes pulses from the pulse generator to establish the time during which the switch S1 is closed, it will be understood that either method may be used in either embodiment.

In the illustrated embodiments a standby pulse rate of 1 pulse every 5 seconds, and a detection pulse rate of 0.2 seconds and a requirement of 5 consecutive pulses to energize the alarm is used by way of example only.

Either embodiment may utilize the system disclosed and claimed in my U.S. Pat. No. 3,917,956, wherein the detector is isolated from the power supply during the time the light-emitting diode is energized, and during this period is powered by a charge stored in a capacitor.

Since certain other changes apparent to one skilled in the art can be made in the herein illustrated embodiments of the invention, it is intended that all matter contained herein be interpreted in an illustrative and not a limiting sense.

I claim:

1. A detector, comprising a radiant energy-producing device pulsing at a predetermined standby rate, means for producing a signal pulse in response to the pulsed radiant energy under predetermined conditions, means responsive to a predetermined number greater than one of produced signal pulses to provide an output signal, and means responsive to a first signal pulse to substantially increase the pulsing rate for a predetermined time sufficient to produce at the increased rate at least said predetermined number of signal pulses less one.

2. A detector as set out in claim 1 in which means is provided for causing the pulse rate to return to the predetermined standby rate after said predetermined time whether or not subsequent pulses have produced a signal pulse.

3. A smoke detector comprising a radiant energy-producing device pulsing at a predetermined rate, means producing a signal pulse in response to the pulsed radiant energy when said radiant energy pulse illuminates a predetermined concentration of smoke, means responsive to a predetermined number greater than one of produced signal pulses to provide an output signal, and means responsive to a first signal pulse to substantially increase the pulse rate to produce at the increased pulse rate at least said predetermined number of pulses less one.

4. A smoke detector as set out in claim 3 in which means is provided for causing the pulse rate to return to the predetermined standby rate after said predetermined number of pulses less one whether or not subsequent pulses have produced output pulses.

5. In a smoke detector of the type utilizing photoelectric detection of light reflected from smoke particles and having a light source, first means energizing said light source by individual pulses, second means producing energy pulses in response to light pulses reflected from smoke particles, and third means responsive to a predetermined number in excess of one of said energy pulses to produce an alarm signal, in which said first means produces pulses at a predetermined standby rate when no smoke is present, the improvement comprising means responsive to an energy pulse produced by said second means in response to light reflected from smoke particles to cause said light source to emit a predetermined number of pulses at a rate considerably greater than that of the predetermined standby rate, said predetermined number of pulses at said greater rate being at least equal to the predetermined number of energy pulses required to produce an alarm, less one, whereby if each of said predetermined number of pulses causes an energy pulse to the third means, an alarm signal is produced.

6. A smoke detector as set out in claim 5 in which means is provided for causing the pulse rate to return to the standby rate when the alarm signal is produced and means is provided for de-energizing the alarm signal prior to the next following pulse, whereby when smoke is continuously present, the alarm signal is produced intermittently.

* * * * *